United States Patent [19]

Fan

[11] Patent Number: 5,460,311

[45] Date of Patent: Oct. 24, 1995

[54] OPTICAL FIBER CLEAVING TOOL

[75] Inventor: Robert J. Fan, Canoga Park, Calif.

[73] Assignee: LiteCom, Inc., Canoga Park, Calif.

[21] Appl. No.: 152,293

[22] Filed: Nov. 12, 1993

[51] Int. Cl.$^6$ .................................................. C03B 37/16
[52] U.S. Cl. .................................. 225/96; 275/94
[58] Field of Search .................... 225/96, 94, 96.5

[56] References Cited

U.S. PATENT DOCUMENTS

| | | | |
|---|---|---|---|
| 4,413,763 | 11/1983 | Lukas | 225/96 |
| 4,530,452 | 7/1985 | Balyasny et al. | 225/96 |
| 4,621,754 | 11/1986 | Long et al. | 225/96 |
| 4,627,561 | 12/1986 | Balyasny et al. | 225/96 |
| 4,644,647 | 2/1987 | Szostak et al. | 225/96 |
| 4,674,666 | 6/1987 | Balyasny | 225/96 |
| 5,108,021 | 4/1922 | Vines | 225/96 |
| 5,301,868 | 4/1994 | Edwards et al. | 225/96 |

*Primary Examiner*—Kenneth E. Peterson

[57] ABSTRACT

An optical fiber cleaving tool a terminus ferrule is affixed to an optical fiber prior to entry of the fiber into the tool. A portion of the optical fiber is passed through an elongated opening which is coaxial about the common axis of the fiber and the terminus ferrule. A sharp pointed fiber scriber is positioned between the exit of the elongated opening and a clamping device such that the scriber will automatically move toward the fiber in controlled motion until an adjustable force is applied through the scriber, impinging on the periphery of the optical fiber. The controlled, increasing radial force of the scriber in conjunction with the tension applied to the fiber by the clamping device causes the fiber to be cleaved in a mirror-surface plane which is substantially perpendicular to the central axis of the optical fiber. The mirrored surface is at essentially a 90° orientation or various angle orientations close to 90° in relation to the fiber central axis. The clamping device of the invention applies increasing radial force on opposite sides of the optical fiber while applying tension to the optical fiber pulling the fiber essentially straight so that the scriber can uniformly impinge on the periphery of the fiber until crack initiation occurs and the controlled cleave takes place. The tool will perform on bare optical fibers or on buffered optical fiber with equal success due to the gradually increasing radially inward force applied by the scriber.

5 Claims, 8 Drawing Sheets

OPTICAL FIBER CLEAVING TOOL

FIELD OF THE INVENTION

This invention relates to cleaving tool for cleaving an optical fiber in a plane substantially perpendicular or an angle other than perpendicular to the optical fiber longitudinal axis. The invention also relates to cleaving the fiber with slowly increasing radial force upon the fiber.

BACKGROUND OF THE INVENTION

An optical fiber used for purposes of transmitting an optical pulse or signal must be properly prepared at fiber ends where it may be necessary to align in close abutment one fiber end to another fiber end thereby continuing the path with least disruption of the optical signal. Other situations arise when it is beneficial to properly prepare the fiber end for close positioning with an active optical receiving or transmitting element for example. Generally, the preferred proper preparation includes an optical fiber endface which is perpendicular to the fiber central axis and the endface which has as perfectly smooth, mirror quality finish as can possibly be obtained.

The present invention is an improved and novel manner of obtaining the best possible cleaved optical fiber endface over prior art such as U.S. Pat. No. 4,530,452 dated Jul. 23, 1985 and U.S. Pat. No. 4,674,666 dated Jun. 23, 1987.

SUMMARY OF THE INVENTION

The invention described herein relates to an apparatus which will cleave an optical fiber, the optical fiber being either bare or having a variety of coatings, protective and typically of a softer material than said optical fiber which itself consists of a core and coaxial cladding. The said apparatus is referred to herein as a cleaving tool. The said optical fiber referred to in the description of the present invention may be a step-index fiber, a graded index fiber, a plastic-clad silica fiber, a glass clad silica fiber or a plastic-clad plastic core, all of any number of various compounds and materials which exist and are suitable as such optical fiber components. Said optical fiber may also have a protective coating of any number of available dioxide, monoxide, polyimide or other thin coatings bonded to said optical fiber core or cladding. The cleaving tool comprises a hollow shaft means with central axis in alignment with clamping members on either end to contain and position an optical fiber or a buffered optical fiber. The first clamping member may be part of the present invention applied to said optical fiber following entry of said optical fiber into and through said hollow shaft means or the first clamping member may be an independent element affixed to said optical fiber prior to entry of said fiber into and through said hollow shaft of the cleaving tool. In the latter case, said cleaving tool will contain a stopping means to locate said independent clamping element within said hollow shaft with required configuration for so locating. A second clamping member will be provided at a given distance from the exit of said hollow shaft through which said optical fiber is passed therethrough and located in said second clamping member. The fiber is exposed between exit from said hollow shaft and entry into said second clamping member such that a sharp-pointed or sharp-edged means may be brought into the periphery of said optical fiber at the proper time to perform a cleaving operation. Said second clamping member is constructed so that it will provide tension on the optical fiber prior to the introduction of the sharp-pointed means to the periphery of the fiber. The amount of tension applied by the second clamping member may be adjustably pre-set and may be automatically applied by a spring-loaded or mechanical ratcheting means. The second clamping member will apply increasing radial pressure to the fiber periphery in two opposing perpendicular directions to the fiber central axis while applying frictional forces to the fiber periphery in the axial direction to assure a non-slip clamping and urging away from the first clamping member of the optical fiber to be cleaved.

The sharp-pointed means is brought to the fiber periphery at the desired point of cleaving by spring-loaded pressure directing the sharp pointed means essentially perpendicular to the fiber axis and fiber periphery. This directed motion of the sharp-pointed means is accomplished in an adjustably pre-set speed as desired and the directed motion may occur while the sharp pointed means is rotated at a continuous 360° as it approaches, touches and applies radially inward pressure of the sharp point to the periphery of the optical fiber. The sharp pointed means is thus rotatably mounted about the hollow shaft to enable controlled contacting of the periphery of the optical fiber extending between the opening of the hollow shaft, through which the optical fiber passes, and the second clamping member. The spring loaded pressure of the sharp pointed means as the sharp pointed means is rotated about the fiber periphery causes a scoring of the optical fiber periphery which, with the continuous tension being applied to the optical fiber between said first and second clamping members, will cause at a single point on the fiber periphery, a crack initiation to occur. Because of the controlled tension applied to the fiber, a crack propagation takes place from the point of crack initiation and the proper perpendicular fiber cleave occurs. Various optical fiber materials may respond more favorably to different conditions of pressure of the sharp pointed means and to different amounts of tension applied by the second clamping member.

In a similar manner, with an arrangement whereby the sharp pointed means is brought to the fiber periphery in an arc-motion, a proper cleave may also be obtained. In this arrangement, the sharp pointed means is rotated about an axis which is at a distance away from the optical fiber and which is parallel to the fiber axis such that the resulting motion of the sharp pointed means contacts the optical fiber at a single point on the optical fiber periphery as the sharp pointed means is moved in an arc motion. Again, with controlled fiber tension provided by the second clamping member, and with an adjustable distance setting of the precise amount of sharp pointed means intruding onto the fiber periphery, a proper fiber cleave may be obtained. Adjustments may be made for various materials of optical fiber to achieve optimum cleaves for these various optical fibers.

Preferably, the optical fiber first clamping means is provided by an externally applied member so that the cleave is performed at a precise distance from the end of this first clamping member and an arrangement is thus provided for a connecting means termination with precise cleaved fiber end location. Alternatively, the hollow shaft may be configured to accept buffered fiber to a pre-determined point and to accept bare fiber for the remainder of the distance the optical fiber passes through to the second clamping member. This will enable a proper cleave to be made on the bare fiber at a set distance from the point at which buffer coating stops.

In another application, either the 360° or arc-type intrusion of the sharp pointed means may be applied directly to the fiber buffer coating. The sharp pointed means will cut through the buffer coat and perform a cleave on the optical fiber as previously described.

DETAILED DESCRIPTION OF THE INVENTION

Figure 1:
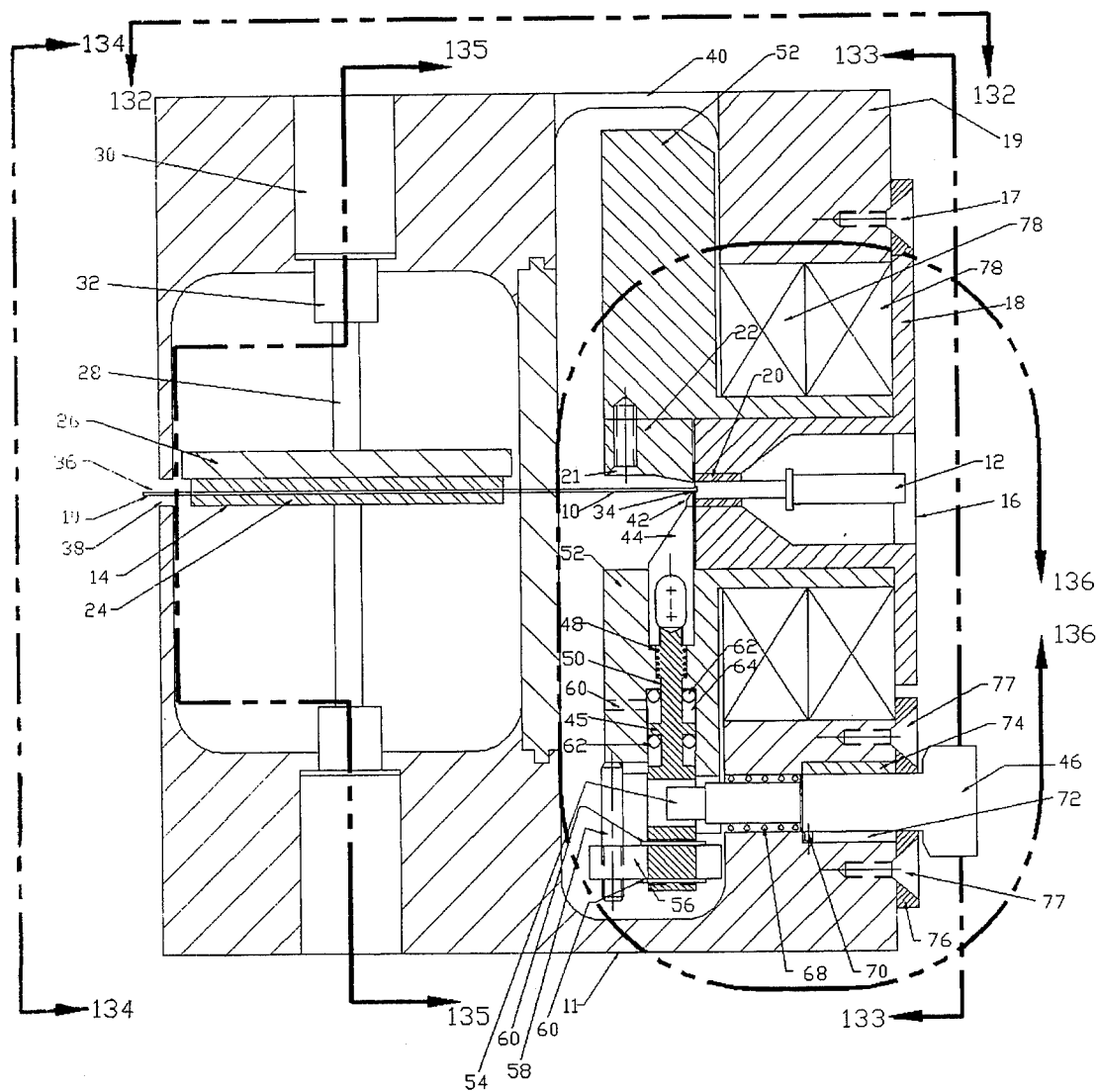
FIG. 1 is a side sectional view of one embodiment of the apparatus of this invention showing 360° rotation of sharp pointed means about an optical fiber, with optical fiber clamp in open position taken along section A—A of FIG. 2.

Referring now to the drawings, FIGS. 1 through 7 show a preferred embodiment of an optical fiber cleaving tool. It is to be understood that the cleaving of the fiber takes place on the fiber periphery whether or not a buffer coat is present on the fiber. That is, if there is a buffer coat, the sharp pointed means must penetrate the buffer coat to score the fiber periphery in order to cleave the fiber in a flat, mirror smooth fiber end configuration which is perpendicular to the central axis of the fiber.

Figure 2:
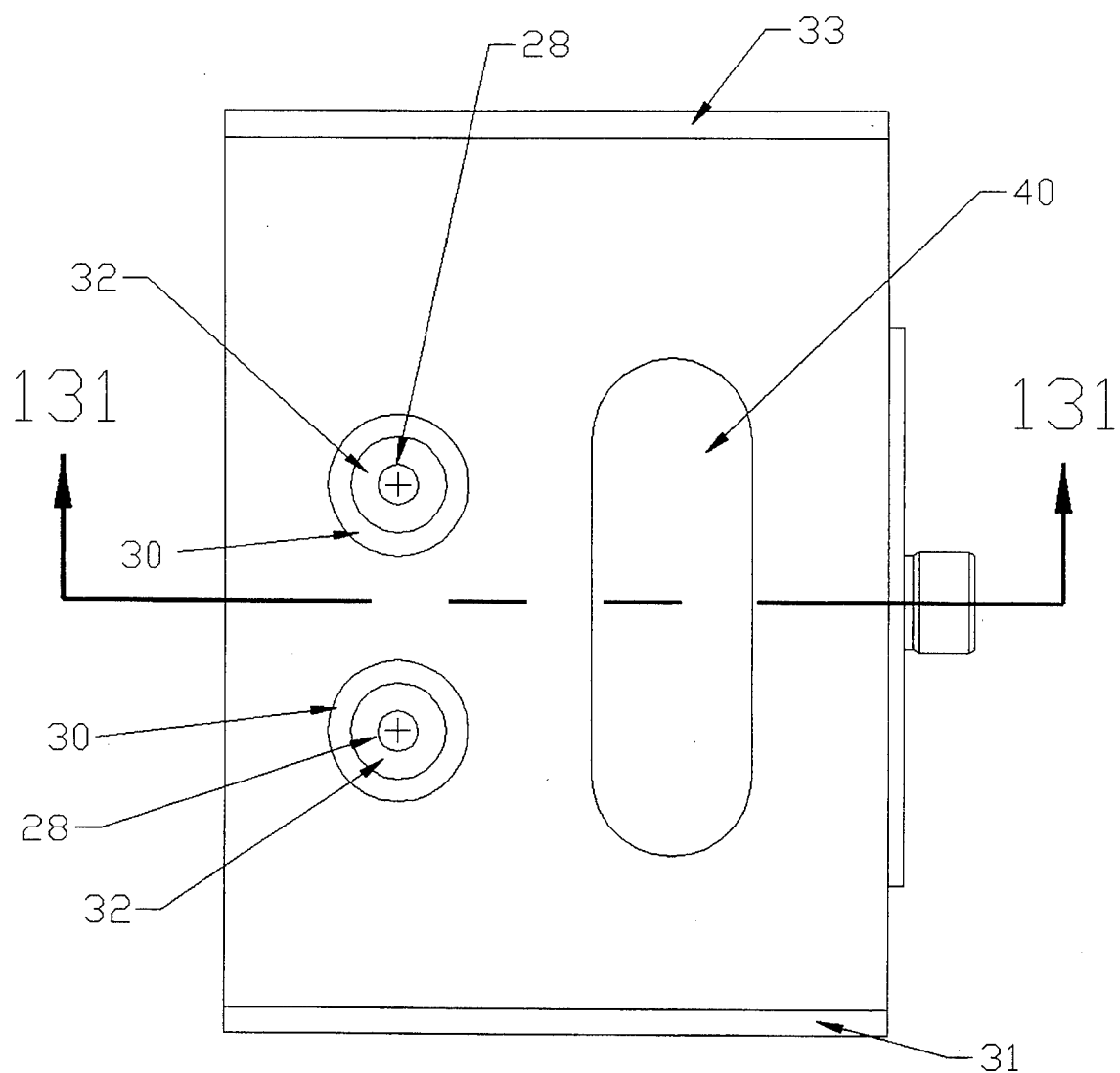
FIG. 2 is a top view of the cleaving tool of FIG. 1 taken from direction B—B of FIG. 1.
Figure 3:
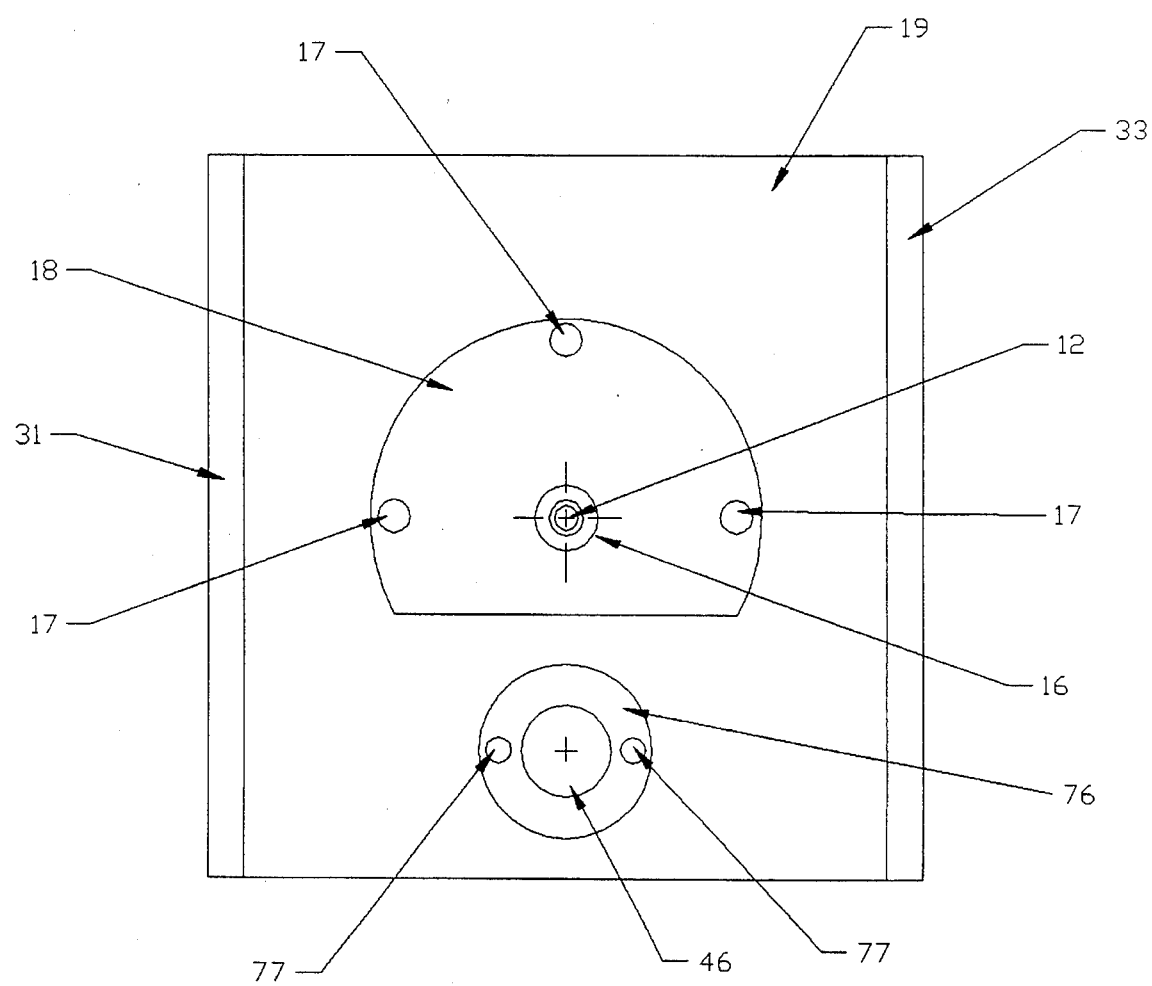
FIG. 3 is a right end view of FIG. 1 taken from direction C—C of FIG. 1.
Figure 4:
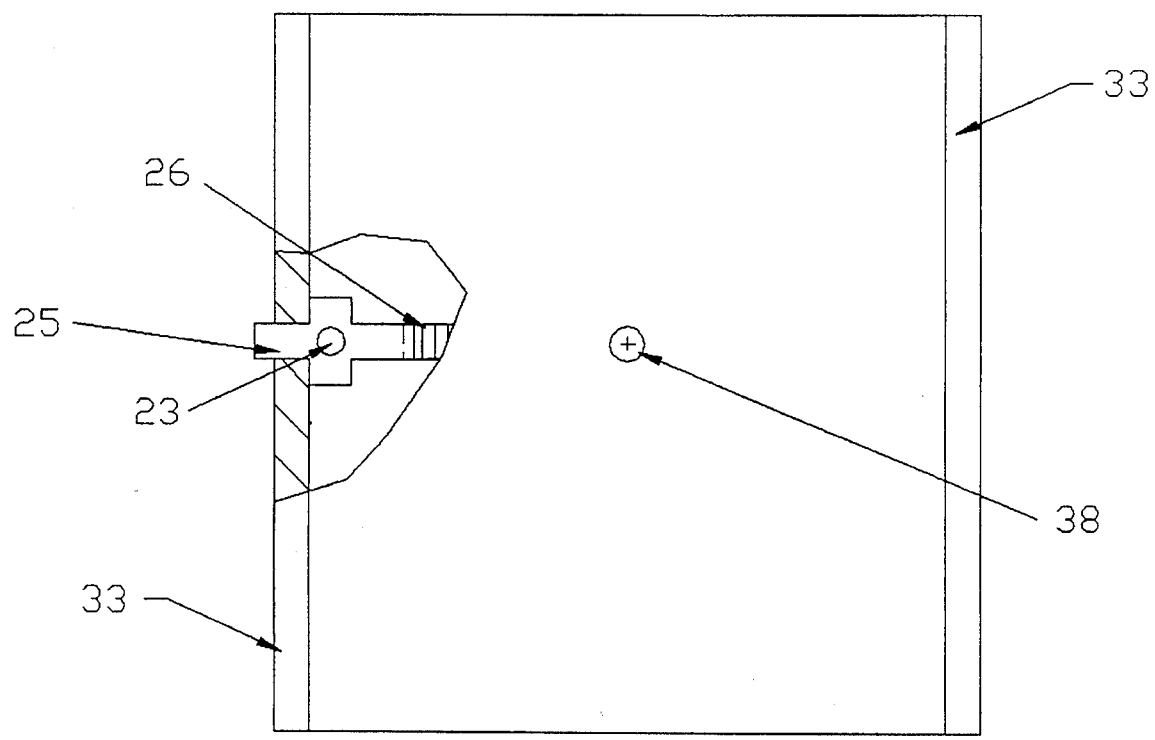
FIG. 4 is a left end view of FIG. 1 taken from direction D—D of FIG. 1.
Figure 5:
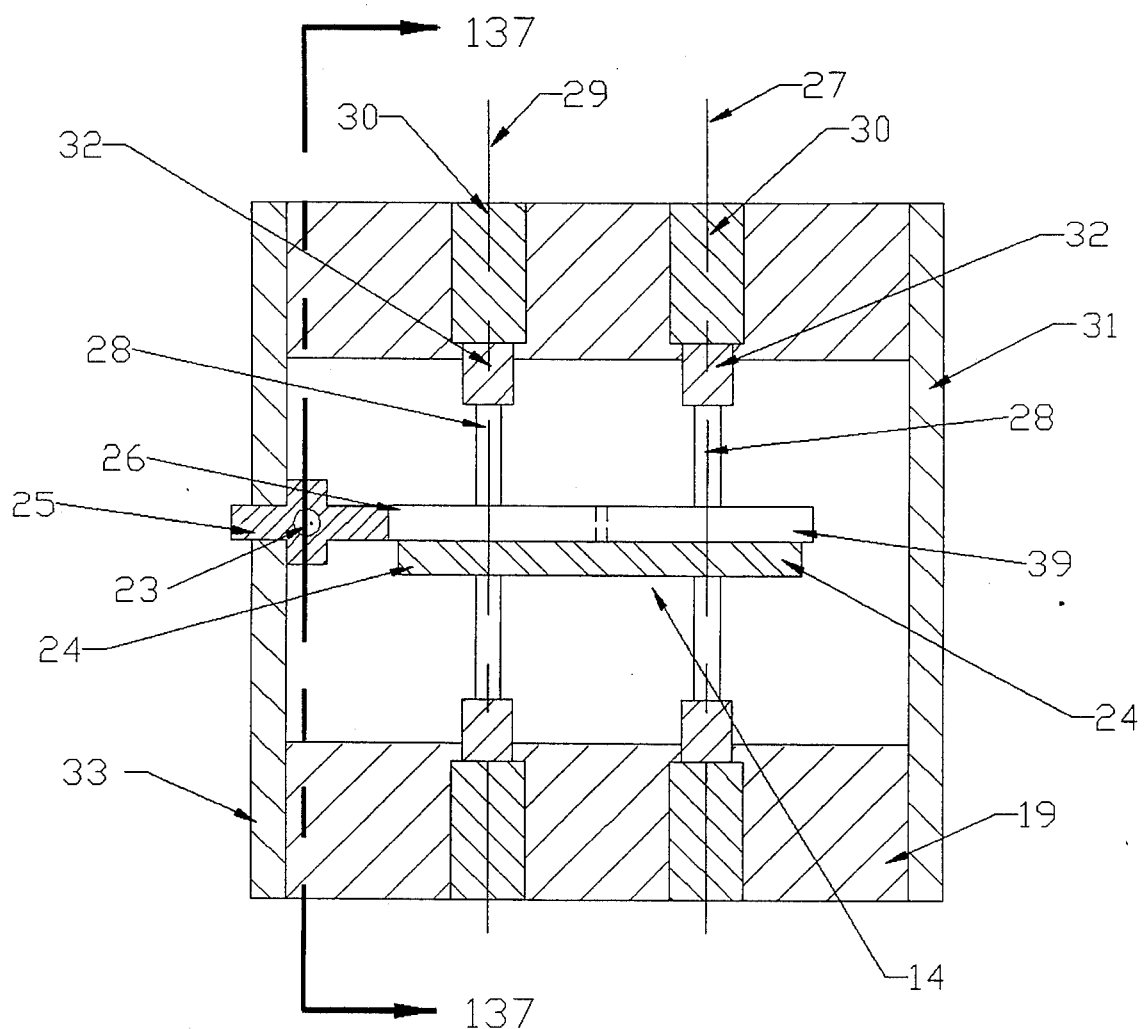
FIG. 5 is a cross sectional view of a portion of FIG. 1 showing second clamping means taken along section E—E of FIG. 1.
Figure 6:
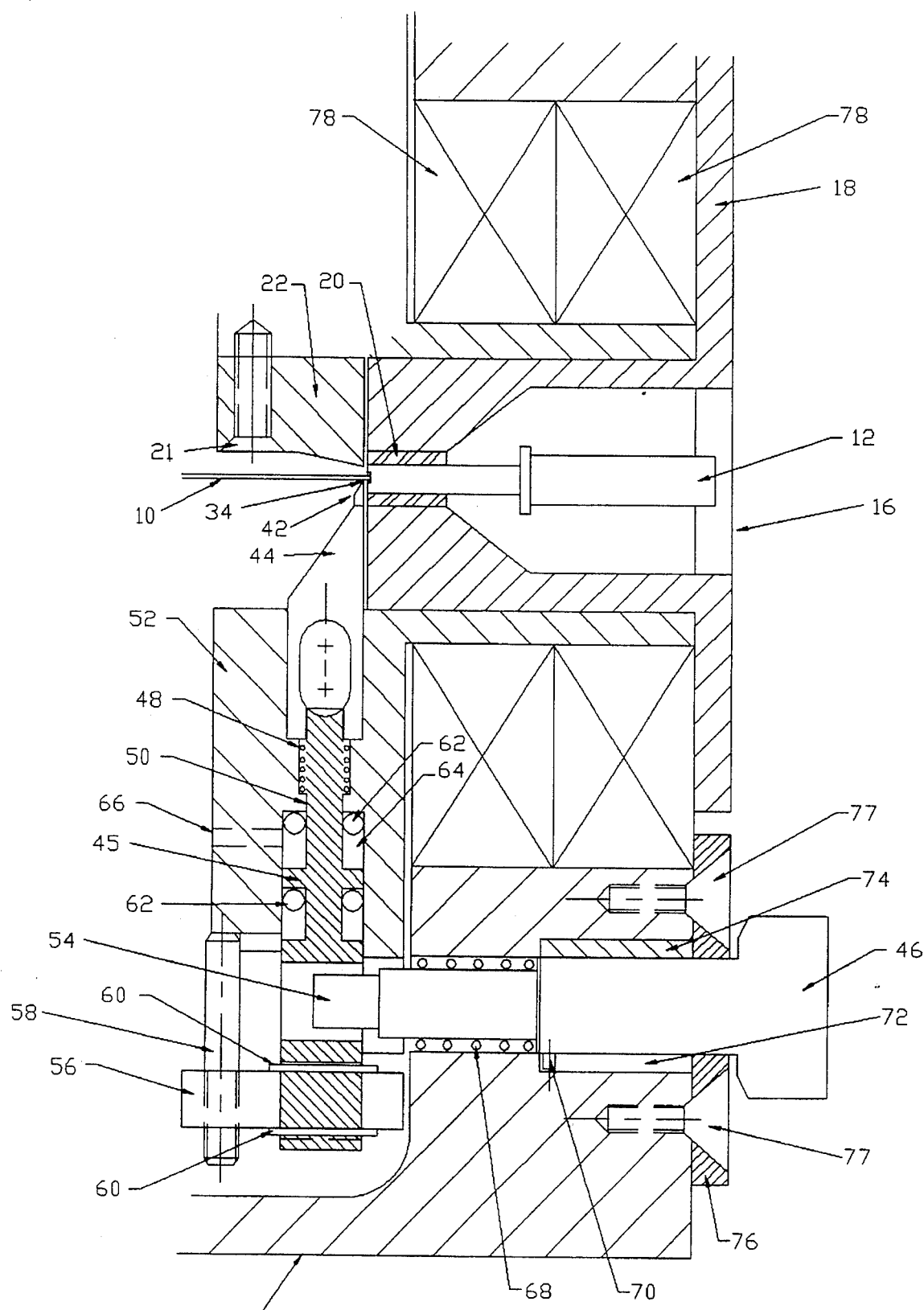
FIG. 6 is a cross-sectional detail view of a portion of FIG. 1 showing first clamping means and sharp pointed means orientation of one embodiment through line F—F of FIG. 1.
Figure 7:
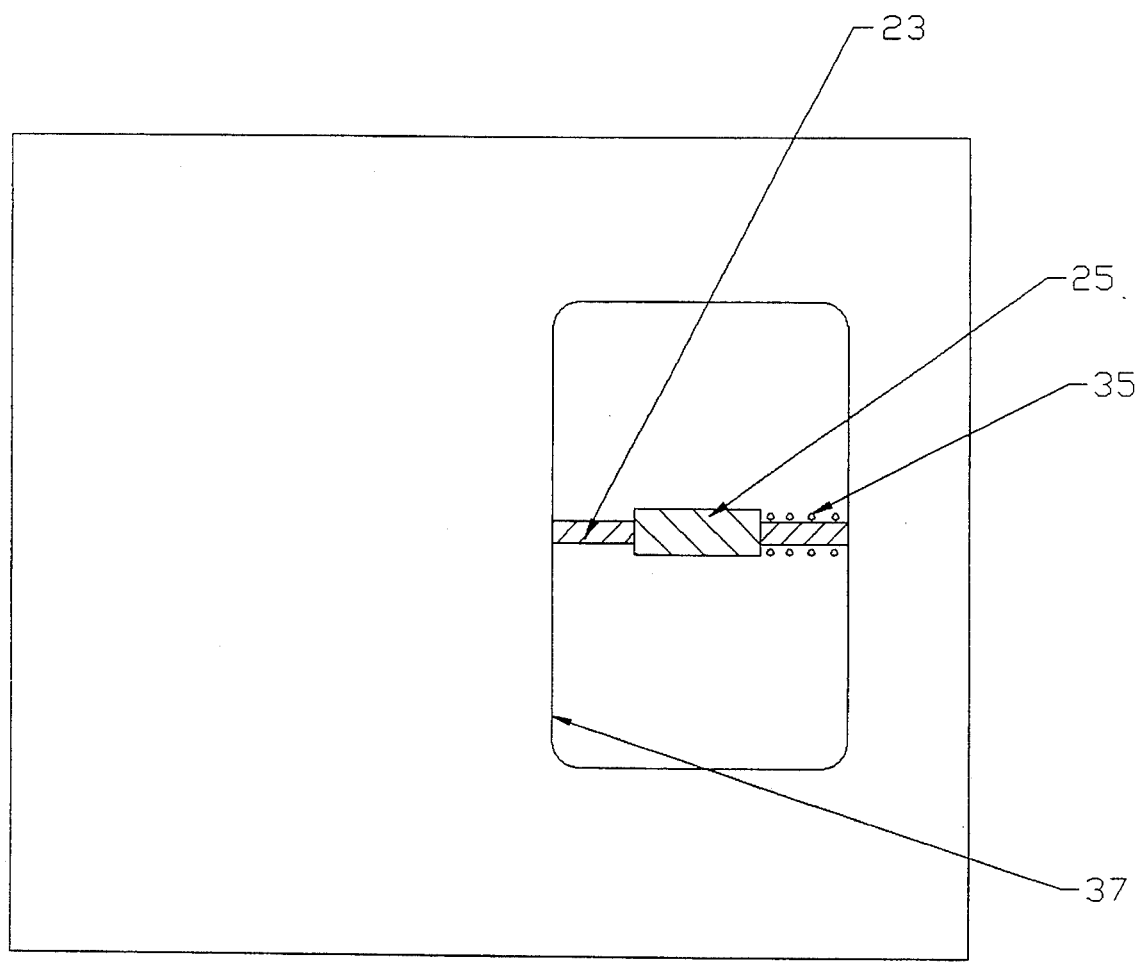
FIG. 7 is cross-sectional view of a portion of FIG. 5 at G—G showing tension-applying member for second fiber clamping means.

The Figures set forth a hand-held embodiment of the tool which may also be adapted to mounting on a work surface, wall or have an additional handle applied for ease of hand usage. In FIGS. 1 and 6 a preferred embodiment of the cleaving apparatus is shown with an optical fiber or buffered fiber 10 captured by a first clamping means 12 affixed to the fiber external to the invention (cleaving tool) and prior to entry into this tool 11. Said optical fiber is firmly held in place with tension applied between fiber exiting first clamping member 12 and second clamping means, 14. This optical fiber and first clamping means 12 are brought slidingly through opening 16 of ferrule holder 18 which is fixed in place to housing 19 by screws 17 as seen in FIGS. 1 and 3. The fiber is funneled to the opening of a precision tip positioner 20. The first clamping means and fiber pass through the tip positioner 20 and are located in place by stop plate 22 held in place with screws 21. The two resilient disk-like members 24 of the second clamping means 14 can be seen in FIG. 5. The second clamping means includes the resilient disks 24 and driving gears 26 mounted on rotatable shafts 28 which turn in opposite rotating directions about axes 27 and 29 with precise locating and rotating bearings 30. Clamps 32 fix shafts 28 to bearings 30. Thus the fiber, having been fixed in the first clamping means 12 and centrally positioned therethrough, exits at 34 and is placed in tension by clamping apparatus 14. Tension is provided by a spring 35 seen in FIG. 7. This spring urges block 25 towards the wall 37 being guided by shaft 23, block 25 having a through hole slidingly fitting over shaft 23. Shaft 23 also serves to maintain the location of spring 35. Block 37, having mating rack teeth urges gear 26 in a direction which in turn urges gear 39 in an opposite direction. Resilient disks 24 are affixed to gears 26 and 39 such that as a manual sliding movement of block 25 rotates disks 24, the fiber 10 can be placed through the tool, exiting at opening 38 in FIG. 4, and the elliptical resilient disks 24 apply increasing radial pressure on fiber 10, urging it out of opening 38. The spring 35 causes the resilient disks 24 to maintain tension on fiber 10 until operation of the sharp pointed means is accomplished with the apparatus shown in FIG. 6. In FIG. 5, covers 31 and 33 are seen which may be removed for access to the tool for servicing. Additionally, cover 33 maintains the position of clamping switch 25. Excess fiber 36 protrudes through opening 38 in wall of housing 19. FIG. 2 is a top view of tool 11 from FIG. 1 being taken from sectional view A—A of FIG. 1. FIG. 2 shows access opening 40 allowing manual positioning of support block 52.

Referring again to FIG. 1, a sharp pointed means 42 mounted on a post 44 is positioned a distance away from the fiber 10. This sharp pointed means 42 is typically a pointed or blade/chisel configuration hard material such as diamond, other stone or tool steel but not limited to these materials. Sharp pointed means 42 is positioned in such a manner as to allow movement slidingly in a direction perpendicular to the central axis of fiber 10. Movement is controlled by a positioner knob 46 which, when rotated, allows the sharp pointed means 42 mounted on post 44 which is connected to piston 45 to move towards fiber 10 being urged in this direction by spring 48 through guiding opening 50 in support block 52.

A key element of the present invention is the controlled intrusion of the sharp pointed means 42 into the periphery of the fiber or buffered fiber 10. This intrusion is controlled by a "dashpot" element which assures controlled slow movement of the sharp pointed means 42 and the post 44 upon which said sharp pointed means 42 is mounted. As the nose 54 of positioner knob 46 is rotated 90°, the nose 54 being of elliptical or truncated diameter cross sectional configuration allows spring 48 to urge post 44 towards the fiber 10, carrying sharp pointed means 42, piston 45, cap 56, stop 58 and retaining rings 60 along with it. To provide the time-controlled "dashpot" movement, sealing rings 62 trap air in chamber 64 as the spring 48 urges piston 45 et al forward. Orifice 66 allows only a controlled exit flow of the air trapped in chamber 64 as the piston 45 is urged forward. The rate of air escape determines the velocity of motion of piston 45 et al when released by rotation of positioner knob 46. In this manner, the sharp pointed means 42 slowly intrudes upon the periphery of the fiber 10 as desired for a controlled, precision cleaving operation.

Furthermore, an additional key element of this embodiment of the present invention is a 360° rotation of the sharp pointed means 42 around the fiber 10 as the sharp pointed means intrudes upon the fiber 10 periphery. This controlled condition of sharp pointed means 42 upon a fiber 10 while fiber 10 is subjected to tension promotes a crack initiation and ensuing crack propagation resulting in superior cleaving. The 360° rotation is accomplished with rotation of support block 52 through opening 40 in housing 19 by finger or thumb tangential rotation of the outer diameter of disk-like support block 52. The positioner knob 46 is retracted from the position shown in FIG. 1 by means of spring 68 urging positioner knob 46 away from piston 45 prior to rotation of support block 52. 90° rotation of positioner knob 46 allows pin 70 to reach opening 72 in bushing 74 and the positioner knob 46 is moved away from piston 45 with plate 76 held by screws 77 providing a stop for pin 70 as seen in FIGS. 1 and 3. This retraction of the positioner knob 46 is accomplished prior to rotation of support block 52. Support block 52 is allowed to rotate with minimal friction by being mounted to the inside diameter openings of roller bearings 78.

Thus, support block 52 is free to rotate 360° after positioner knob 46 is retracted. Fiber 10 does not rotate since first clamping member 12 is mounted in tip positioner 20 fixed internal to the throughput opening of ferrule holder 18 attached to housing 19 with screws 17. There is a closely controlled slip fit of support block 52 over the outside diameter of ferrule holder 18.

Figure 8:
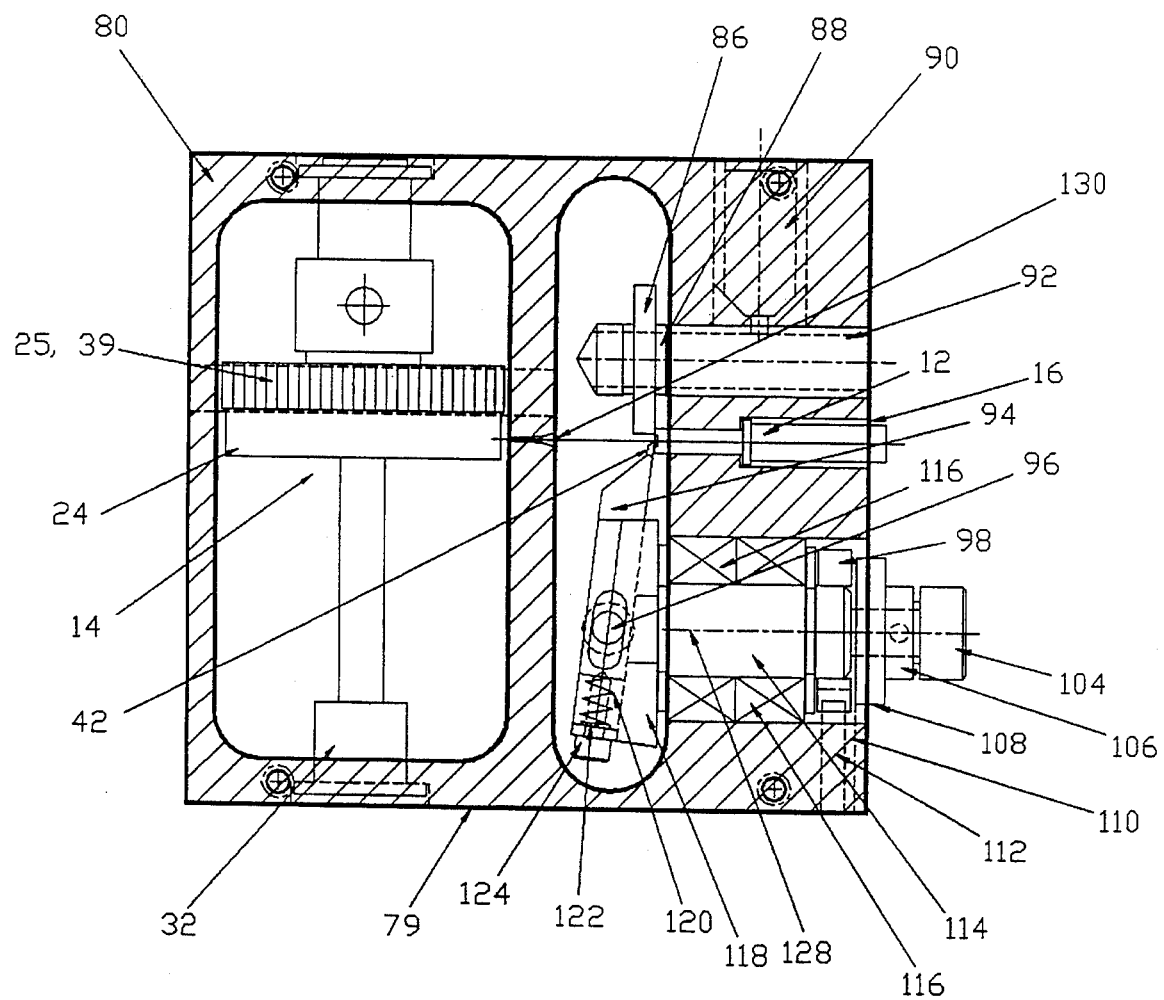
FIG. 8 is a cross-sectional view of another embodiment of the apparatus of this invention showing an arc motion of the sharp pointed means scribing the optical fiber showing first clamping means and sharp pointed means orientation.

A second embodiment of the present invention is seen in FIG. 8. This embodiment uses an arc-movement motion of the sharp pointed means 42, mounted on post 94, rotating on shaft 114 about axis 128 with low friction motion provided by bearings 116 mounted in housing 80 of cleaving tool 79. In this embodiment, the fiber 10 is affixed to a ferrule 12 or other clamping device and brought through opening 16 allowing the fiber to pass through opening 130 and into the second clamping means 14 described earlier. A stop plate 86 is mounted on member 92 with retaining ring 88 and can be precisely adjusted to position the fiber 10 exiting the ferrule 12 such that the sharp pointed means 42 when brought into arc motion, about axis 128, provides a precise, controlled optical fiber cleave. Set screw 90 locks member 92 in place when positioned properly. The sharp pointed means 42 is held away from the fiber 10 by torsion spring 110 applying torsional force urging shaft 114 in either the clockwise or counterclockwise orientation. Knob 104 has spring washer 106 attached about the cylindrical shaft of the reduced diameter portion of knob 104, urging flat washer 108 against torsion spring 110, maintaining its position. By urging shaft 114 in either clockwise or counterclockwise direction, locating ring 98, which has an arc clearance portion, provides a stop against pin 112, thereby enabling a controlled radial arc of travel of the sharp pointed means 42. The sharp pointed means 42 may have adjustment made to its radial intrusion upon the fiber 10 periphery during the arc swing by means of adjusting screw 124. Because of extreme precision required in positioning the sharp pointed means, spring 120 takes up any thread clearance backlash between post 94 and screw 124. A retaining ring 122 keeps screw 124 in place. Screw 96 assures post 94 is fixed in block 118 and is maintained in proper orientation relative to the axial point of intrusion of the sharp pointed means 42 on fiber 10 at the instant of cleaving. The cleave is accomplished by either positioning the fiber 10, then manually rotating knob 104 while fiber 10 is under tension, or manually rotating knob 104, positioning the fiber 10 under tension, then releasing the torsion of the spring 110 by releasing knob 104 and allowing the sharp pointed means 42 to cleave the fiber in a rapid pass intruding on the fiber 10 periphery as it passes. The key again is that a straight orientation of fiber 10 as tension is applied will provide a better cleave than if the fiber is positioned in other than a straight orientation.

Having described the invention, we claim:

1. An apparatus for cleaving an optical fiber comprising;
   a housing;
   a precise concentric cylindrical opening located in the housing enabling the placing of the optical fiber within the opening allowing the fiber to pass therethrough and extend within the apparatus;
   a fiber capturing ferrule capable of being affixed to the optical fiber said ferrule stopping against a reduced internal diameter of the precise concentric cylindrical opening;
   a fiber tensioning device capable of applying a tensile force to the fiber in the direction of the fiber axis by gripping the fiber periphery and urging it away from the cylindrical opening, this urging being provided by a spring means acting as a pair of resilient disks rotated in mutually opposing rotational directions, an edge surface of each disk gripping the fiber periphery with radial pressure as the disks are rotated;
   a sharp pointed means rotatable continuously about said optical fiber while the fiber is placed in axial tension, a moving means for slowly moving said sharp pointed means towards the fiber periphery during rotation eventually striking the fiber periphery and scoring the fiber as the sharp pointed means continues to press against the fiber while rotating about the fiber.

2. The apparatus as in claim 1 in which the fiber capturing ferrule holding an optical fiber has a recessed counter bored opening which allows the fiber to be unsupported for a distance on either side of the point of impact of the sharp pointed means, enhancing the quality of the resulting perpendicular, mirror-smooth cleaved fiber end.

3. The apparatus as in claim 1 further comprising;
   a mechanism incorporated in said apparatus whereby the continuous rotation means may be stopped at a point by a slidingly moved, retractable cylindrical pin entering an opening in the continuously rotating disk, said cylindrical pin having a feature on a portion of the length of the pin which when adjusted by an end of said pin which extends to the outside of said housing, will cause the sharp pointed means to move towards or away from the optical fiber depending upon adjusted position of said cylindrical pin.

4. The apparatus as in claim 1 in which said fiber tensioning device urges excess fiber away from the sharp pointed means following cleaving, and an exit opening is provided in said apparatus allowing automatic removal of said excess fiber from the apparatus.

5. The apparatus as in claim 1 in which an adjustable position stop is provided to enable various depth of penetration of the sharp pointed means into the fiber periphery.

* * * * *